United States Patent
Chasman et al.

(10) Patent No.: US 9,098,618 B2
(45) Date of Patent: *Aug. 4, 2015

(54) VALIDATING VISUAL COMPONENTS

(71) Applicant: salesforce.com, inc., San Francisco, CA (US)

(72) Inventors: Doug Chasman, Pittsford, NY (US); Billy Ma, Berkeley, CA (US)

(73) Assignee: salesforce.com, inc., San Francisco, CA (US)

(*) Notice: Subject to any disclaimer, the term of this patent is extended or adjusted under 35 U.S.C. 154(b) by 255 days.

This patent is subject to a terminal disclaimer.

(21) Appl. No.: 13/766,152

(22) Filed: Feb. 13, 2013

(65) Prior Publication Data

US 2013/0167122 A1    Jun. 27, 2013

Related U.S. Application Data

(63) Continuation of application No. 12/943,786, filed on Nov. 10, 2010, now Pat. No. 8,566,792.

(60) Provisional application No. 61/332,666, filed on May 7, 2010.

(51) Int. Cl.
*G06K 9/68* (2006.01)
*G06F 17/00* (2006.01)
(Continued)

(52) U.S. Cl.
CPC .............. *G06F 11/3604* (2013.01); *G06F 8/71* (2013.01); *G06F 9/44589* (2013.01)

(58) Field of Classification Search
CPC .............. G06F 8/71; G06F 8/34; G06F 8/24; G06F 8/30; G06F 17/30864; G06F 17/30899; G06F 17/30905; G06F 17/30917; G06F 17/3089; G06F 11/3624; G06F 17/5081; G05B 2219/25428
See application file for complete search history.

(56) References Cited

U.S. PATENT DOCUMENTS 5,577,188 A    11/1996    Zhu
5,608,872 A    3/1997    Schwartz et al.
(Continued)

OTHER PUBLICATIONS

U.S. Office Action dated Jul. 3, 2013 issued in U.S. Appl. No. 12/969,294.
(Continued)

*Primary Examiner* — Don Wong
*Assistant Examiner* — Anibal Rivera
(74) *Attorney, Agent, or Firm* — Weaver Austin Villeneuve & Sampson LLP

(57) ABSTRACT

Methods, systems, apparatus, and computer-readable media for validating components of a dynamic user interface in an on-demand multi-tenant service environment are disclosed. Organizations corresponding to tenants in the on-demand multi-tenant service environment are identified. A multi-tenant database system residing on multiple servers is provided for each of the identified organizations. Dynamic user interface pages associated with the organizations are identified. First and second compilation outputs based upon respective first and second invocations of a compiler configured to compile the one or more dynamic user interface pages are produced with reference to respective first and second builds of computer program code. Differences between the first and second compilation outputs are identified and presented in a user interface on a display device of the multi-tenant service environment. The differences can be identified by performing a comparison and selecting one or more differences that match a pattern specifier.

21 Claims, 11 Drawing Sheets

(51) Int. Cl.
  *G06F 15/16* (2006.01)
  *G06F 15/173* (2006.01)
  *G06F 17/20* (2006.01)
  *G06F 17/28* (2006.01)
  *G06F 9/44* (2006.01)
  *G06F 9/45* (2006.01)
  *G06F 11/36* (2006.01)
  *G06F 9/445* (2006.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,745,897 A * | 4/1998 | Perkins et al. ............... 709/224 |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,038,395 A * | 3/2000 | Chow et al. ............... 717/105 |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,311,327 B1 * | 10/2001 | O'Brien et al. ............... 717/114 |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,240,258 B1 | 7/2007 | Hayes |
| 7,269,590 B2 | 9/2007 | Hull et al. |
| 7,287,218 B1 * | 10/2007 | Knotz et al. ............... 715/209 |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,530,058 B2 * | 5/2009 | Ebbo et al. ............... 717/143 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,900,192 B2 | 3/2011 | Patterson |
| 7,941,438 B2 * | 5/2011 | Molina-Moreno et al. ... 717/136 |
| 7,945,653 B2 | 5/2011 | Zuckerberg et al. |
| 8,005,896 B2 | 8/2011 | Cheah |
| 8,006,231 B2 | 8/2011 | Peipelman et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,214,805 B2 | 7/2012 | Stewart |
| 8,275,836 B2 | 9/2012 | Beaven et al. |
| 8,312,428 B2 | 11/2012 | Zhao |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,533,664 B2 | 9/2013 | Wang et al. |
| 8,566,301 B2 | 10/2013 | Rueben et al. |
| 8,566,792 B2 | 10/2013 | Chasman et al. |
| 8,646,103 B2 | 2/2014 | Jakobson et al. |
| 8,713,530 B2 | 4/2014 | Waite et al. |
| 8,914,438 B2 | 12/2014 | Pletter et al. |
| 8,959,483 B2 | 2/2015 | Waite et al. |
| 2001/0032332 A1 | 10/2001 | Ward et al. |
| 2001/0044791 A1 | 11/2001 | Richter et al. |
| 2002/0040469 A1 * | 4/2002 | Pramberger ............... 717/121 |
| 2002/0072951 A1 | 6/2002 | Lee et al. |
| 2002/0082892 A1 | 6/2002 | Raffel |
| 2002/0129352 A1 | 9/2002 | Brodersen et al. |

(56) References Cited

U.S. PATENT DOCUMENTS

| | | |
|---|---|---|
| 2002/0138510 A1 | 9/2002 | Tan |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0023639 A1 | 1/2003 | Chen et al. |
| 2003/0051066 A1* | 3/2003 | Pace et al. ............. 709/316 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0217331 A1* | 11/2003 | McKellar et al. ........... 715/511 |
| 2003/0225730 A1 | 12/2003 | Warner et al. |
| 2003/0233621 A1* | 12/2003 | Paolini et al. ............. 715/522 |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153772 A1 | 8/2004 | Gorshenev et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188357 A1* | 8/2005 | Derks et al. ............. 717/124 |
| 2005/0268292 A1* | 12/2005 | Ebbo et al. ............. 717/145 |
| 2006/0225054 A1 | 10/2006 | Sentovich et al. |
| 2007/0050467 A1 | 3/2007 | Borrett et al. |
| 2007/0226314 A1* | 9/2007 | Eick et al. ............. 709/217 |
| 2008/0082572 A1 | 4/2008 | Ballard et al. |
| 2008/0168426 A1* | 7/2008 | Mitran et al. ............. 717/126 |
| 2008/0183687 A1 | 7/2008 | Law |
| 2008/0249972 A1 | 10/2008 | Dillon |
| 2008/0295076 A1 | 11/2008 | McKain et al. |
| 2008/0310736 A1* | 12/2008 | Chattopadhyay et al. .... 382/218 |
| 2009/0049065 A1 | 2/2009 | Weissman |
| 2009/0049101 A1 | 2/2009 | Weissman |
| 2009/0049102 A1 | 2/2009 | Weissman |
| 2009/0049288 A1 | 2/2009 | Weissman |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0313600 A1* | 12/2009 | Ayers et al. ............. 717/106 |
| 2010/0083097 A1 | 4/2010 | Katz et al. |
| 2010/0191690 A1* | 7/2010 | Bitonti et al. ............. 706/47 |
| 2011/0145803 A1 | 6/2011 | Soderstedt |
| 2011/0179398 A1 | 7/2011 | Peterson |
| 2011/0218958 A1 | 9/2011 | Warshavsky et al. |
| 2011/0247051 A1 | 10/2011 | Bulumulla et al. |
| 2011/0276945 A1 | 11/2011 | Chasman et al. |
| 2011/0276946 A1 | 11/2011 | Pletter |
| 2011/0283181 A1 | 11/2011 | Waite et al. |
| 2011/0283267 A1 | 11/2011 | Waite et al. |
| 2011/0289140 A1 | 11/2011 | Pletter et al. |
| 2011/0289141 A1 | 11/2011 | Pletter et al. |
| 2011/0289425 A1 | 11/2011 | Pletter et al. |
| 2011/0289479 A1 | 11/2011 | Pletter et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0165040 A1 | 6/2014 | Augustin et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |

OTHER PUBLICATIONS

U.S. Final Office Action dated Nov. 15, 2013 issued in U.S. Appl. No. 12/969,294.

U.S. Office Action dated Aug. 14, 2013 issued in U.S. Appl. No. 13/104,772.

U.S. Final Office Action dated Feb. 11, 2014 issued in U.S. Appl. No. 13/104,772.

U.S. Office Action dated Aug. 14, 2013 issued in U.S. Appl. No. 13/104,775.

U.S. Notice of Allowance dated Feb. 19, 2014 issued in U.S. Appl. No. 13/104,775.

U.S. Notice of Allowance dated Aug. 28, 2013 issued in U.S. Appl. No. 12/943,786.

U.S. Notice of Allowance dated Nov. 5, 2012 issued in U.S. Appl. No. 12/943,786.

Aulbach et al. (Jun. 9-12, 2008) "Multi-Tenant Databases for Software as a Service: Schema-Mapping Techniques", ACM SIGMOD 2008, [Retrieved on Sep. 5, 2012]. Retrieved from the internet: <URL: http://dl.acm.org/citation.cfm?id=1376736> 12 Pages (1195-1206).

"Google Plus Users", Google+Ripples, Oct. 31, 2011 [retrieved on Feb. 21, 2012 from Internet at http://www.googleplusers.com/google-ripples.html], 3 pages.

U.S. Office Action dated Jun. 11, 2014 issued in U.S. Appl. No. 12/969,294.

U.S. Final Office Action dated Oct. 31, 2014 issued in U.S. Appl. No. 12/969,294.

U.S. Notice of Allowance dated Dec. 31, 2014 issued in U.S. Appl. No. 12/969,294.

U.S. Notice of Allowance dated Sep. 23, 2014 issued in U.S. Appl. No. 13/104,772.

U.S. Notice of Allowance dated Dec. 10, 2014 issued in U.S. Appl. No. 13/104,772.

Bowen, Judy and Reeves, Steve (Jun. 2011) "UI-Driven Test-First Development of Interactive Systems," *EICS'11*, Pisa, Italy, pp. 165-174.

Garg, A.; Vidyaraman, S.; Upadhyaya, S.; Kwiat, K. (Apr. 2006) "USim: A User Behavior Simulation Framework for Training and Testing IDSes in GUI Based Systems," *Proceedings of the 39th Annual Simulation Symposium (ANSS'06) IEEE*, Computer Society, 8 pp.

"Selenium Documentation", Release 1.0, *Selenium Project*, Feb. 24, 2010, 164 pp.

* cited by examiner

VALIDATING VISUAL COMPONENTS

PRIORITY AND RELATED APPLICATION DATA

This patent document is a continuation of and claims priority to co-pending and commonly assigned U.S. patent application Ser. No. 12/943,786, titled "Validating Visual Components", by Chasman et al., filed on Nov. 10, 2010, which claims priority to commonly assigned U.S. Provisional Patent Application No. 61/332,666, titled "Methods and Systems for Validating Visual Components in a Multitenant Database Environment", by Chasman et al., filed on May 7, 2010, both of which are hereby incorporated by reference in their entirety and for all purposes.

TECHNICAL FIELD

This patent document relates generally to on-demand services provided over a data network such as the Internet and, more specifically, to validation of computer programs in a software service environment.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer programs and data, such as computer program source code or a markup language definition of a web page, can be interpreted, translated, or compiled by a compiler to produce instructions more readily executable by a computer. These actions are often performed with reference to external program code or markup language definitions that are used as building blocks for the computer program or markup language definition. The compiler, external program code, and markup language definition building blocks can be provided by a software vendor or service provider, who may upgrade, i.e., change or enhance, the building blocks, and provide new versions to be used in place of previous versions.

With some conventional approaches, "client" computer programs access the features of the building blocks through defined interfaces, e.g., particular function names with particular parameters, or particular markup language definition names. The interfaces are meant to allow the provider to change and enhance the details of the building block implementations without affecting the interfaces used by the client programs. Thus, the building blocks are upgraded from time to time by replacing an existing file of external program code or markup language definitions with a new version of the file. The new version may contain the same interfaces, in which case the client program interactions with the new version are expected to remain the same as in the previous version, and the features of the new version are ordinarily expected to be substantially compatible with those of the previous version. In some cases, however, the client program does not continue to work properly with the new version. For example, unexpected problems may occur if there are errors in the new version or ambiguities or misunderstandings in the client's use of the interfaces.

BRIEF DESCRIPTION OF THE DRAWINGS

The included drawings are for illustrative purposes and serve only to provide examples of possible structures and process operations for the disclosed systems, apparatus, and methods for validating computer program code.

DETAILED DESCRIPTION

Figure 1:
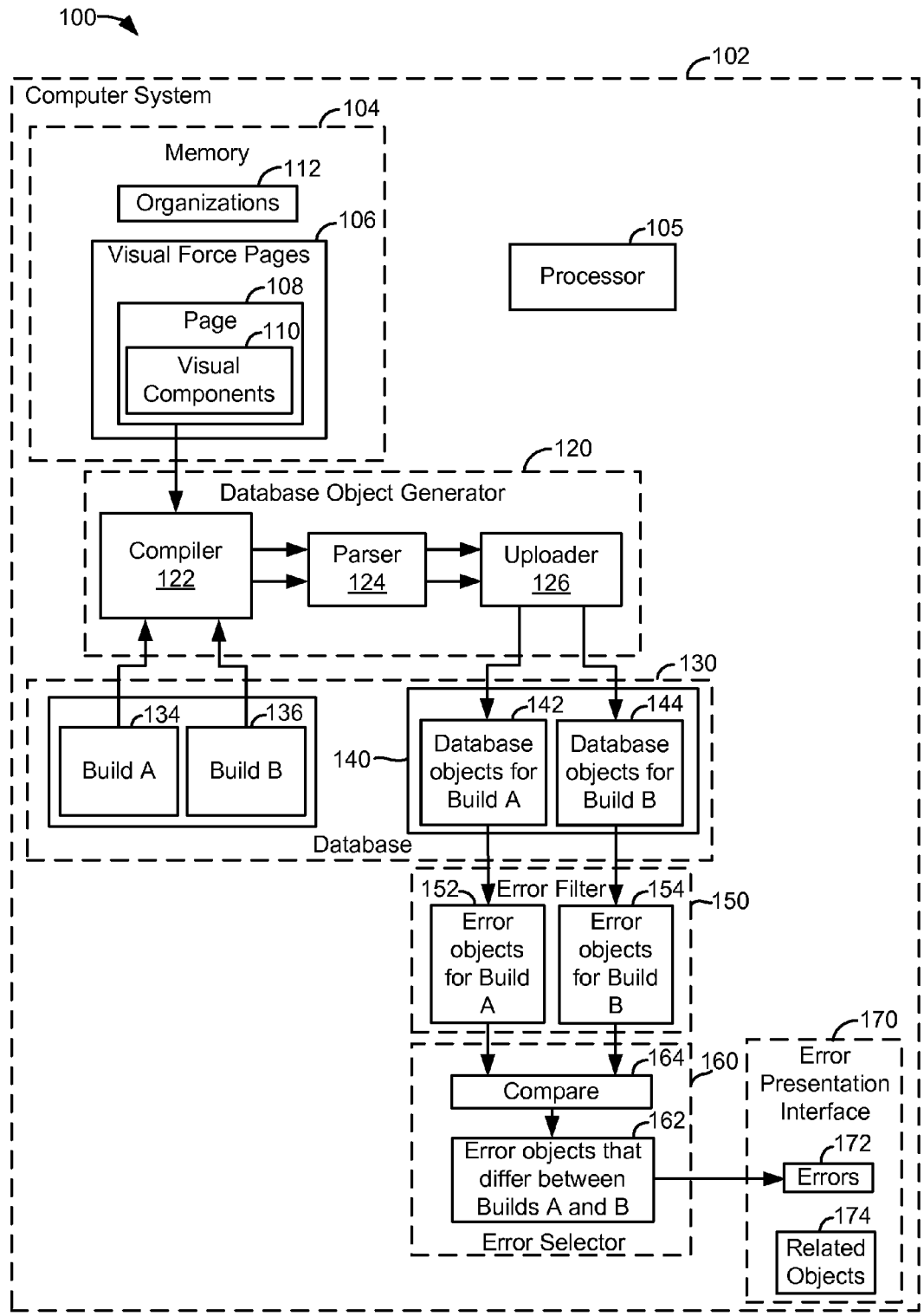
FIG. 1 shows a system diagram illustrating validation logic 100 in an on-demand multi-tenant service environment, in accordance with embodiments.

While the present application will be described with reference to a few specific embodiments, the description and specific embodiments are merely illustrative and are not to be construed as limiting. Various modifications can be made to the described embodiments without departing from the true spirit and scope as defined by the appended claims. For example, the steps of processes shown and described herein are not necessarily performed in the order indicated. It should also be understood that the processes may include more or fewer steps than are indicated. In some implementations, steps described herein as separate steps may be combined. Conversely, what may be described herein as a single step may be implemented in multiple steps.

Similarly, device functionality may be apportioned by grouping or dividing tasks in any convenient fashion. For example, when steps are described herein as being performed by a single device (e.g., a single printer, handheld device, logic device, or server), the steps may alternatively be performed by multiple devices and vice versa. When components are shown as part of a single device, such as the components of the computer system 102 of FIG. 1, one or more of the components may alternatively be located on different devices. For example, the logic components of FIG. 1 may be distributed across different servers in a computer network. Moreover, any specific components, parameters, and numerical values described herein are provided merely by way of example and are in no way limiting. The drawings referenced herein are not necessarily drawn to scale.

Disclosed are embodiments of methods and apparatus in an on-demand multi-tenant service environment for validating computer program code, including markup-language descriptions of user interface pages. Users of the multi-tenant service environment can create and submit computer program code, such as page descriptions and associated page program code that implements actions to be performed by the pages, to be executed in the service environment. When a new version of the service environment's implementation is developed, e.g., with new features, changes are made to the implementation program code. To ensure that the changes introduced in the new version are compatible with existing user-submitted program code from one or more users, the user-submitted code can be processed by a "compiler" component of the service environment, which translates the user-provided code to an intermediate representation that is more readily executable than the source code representation provided by the user. Embodiments of the methods and apparatus disclosed herein can validate that when given computer program code is processed (e.g. compiled, by a "new" version of the service environment implementation code), the results generated by the compiler (e.g. error messages and other types of output) are substantively similar to earlier results previously generated using a previous version of the service environment code. If the results generated by the two versions are not sufficiently similar, then the validation has failed and information about the differences is presented to a user.

For example, the compiler results can be compared to earlier results generated by an earlier version of the compiler and service environment for the same user-provided code. If the new results are substantively similar to the earlier results, then the computer program code provided by the user and the service environment implementation code are considered to have passed the validation test. If the new and earlier results differ, then the new service environment implementation code may be incompatible with the earlier version, in which case the implementation code has failed the validation test. Upon detection of such a validation test failure, error information can be presented to the user indicating the nature of the differences between the results for the two different versions of the code.

FIG. 1 shows a system diagram illustrating validation logic 100 in an on-demand multi-tenant service environment, such as that provided by Salesforce.com® of San Francisco, Calif., in accordance with embodiments. Salesforce.com® provides implementations of the on-demand multi-tenant service environment in the form of computer program code that can be accessed via a Web browser as described elsewhere herein. A computer system 102, e.g., a server in the on-demand multi-tenant service environment, includes memory 104, an on-demand multi-tenant database 130, and a processor 105 configured to execute or implement the validation logic 100. The computer system 102 and database 130 can be provided, for example, by Salesforce.com® in the form of one or more network-accessible servers. The validation logic 100 identifies regression errors that occur between two different builds or versions, e.g., computer program code implementations, of portions of the on-demand multi-tenant service environment. A regression error is, for example, an error that occurs when computer program code is compiled and/or executed using one version or build, but does not occur when the code is compiled and/or executed using a different version or build. Compiling computer program code can include, for example, translating the code to a different representation to be executed by the processor 105.

In one aspect, the portions of code that are validated can be portions of code referenced when compiling user interface pages 106 described in accordance with a markup language such as the Visualforce markup language provided by Salesforce.com®. The user interface pages 106 are, for example, web pages created using the Visualforce page development tool available from Salesforce.com®. In one embodiment, the Visualforce markup language can be understood as a format in which user interface pages 106 can be specified with textual tags and attribute values associated with the tags embedded in the page content.

Users of the on-demand multi-tenant service environment can define the user interface pages 106 in the markup language. The pages 106, which include at least one page 108, can be translated into standard HTML web pages (not shown) or other formats of displayable information and/or executable code having runtime information processing capabilities, such as Portable Document Format (PDF), the Adobe® Flash® format, or the like. The translated pages can be displayed, executed, or otherwise presented in the on-demand multi-tenant service environment, thereby displaying the content of the page 108 in accordance with the markup language specification embedded in the page. The markup language specification can describe features of the page such as data presentation styles and particular user interface components 110 to be displayed on the page. Furthermore, page program code implemented in a programming language such as Apex or Java can be associated with the page 108 to perform processing such as receiving input data, transforming the data, and generating output data.

In one or more embodiments, the validation logic 100 of FIG. 1 is implemented by a number of components, including database object generator logic 120, which translates the visual user interface pages 106 to database objects 140 and, if errors occur during translation, generates error objects 152, 154 by extracting error information from respective database objects 142, 144. The database objects 140 include database objects 142 resulting from a first build "A" and database objects 144 resulting from a second build "B." The validation logic 100 also includes error filter logic 150, error selection logic 160, and an error presentation interface 170, which process and present the errors 172 and objects 174 related to the errors 172, as described below.

In one or more embodiments, during the compilation process, errors can occur for various reasons, such as the presence of incorrect or erroneous computer program code in the build, absence of code or interfaces that are documented as being accessible to user code or markup in the pages, but are not present in the build, or other differences between the build and the defined interfaces. Such incorrect or erroneous code can be introduced into a build in various ways, such as a programmer modifying code in a way that changes an interface, or an error occurring in a compilation process. Compilation errors can occur if the user modifies a user program in such a way that the program does not correctly access the documented interface, or a documented interface is changed, but the programmer does not make corresponding changes to the program. Failure to compile can be caused by an error or bug in the compiler 122 itself, or a system error such as insufficient disk or memory space. The validation logic 100 of FIG. 1 compares the output of the compiler 122 for an input page 108 when the page is compiled using first and second builds 134, 136. Differences between the compiler output for the two builds can include, for example, error messages produced by the compiler 122 when the page is compiled using one of the builds but not produced when the page is compiled using the other build.

If there are substantive differences between the compiler outputs, e.g., different error messages, for the two builds, then the validation has failed, and the validation logic 100 presents the substantive differences in a user interface 170. Substantive differences are distinguished from nonsubstantive differences because the compiler output may contain information that can change between two different invocations but is not related to the success or failure of the compilation. Such changing information may include, for example, dates and times embedded in the compiler output, file system directory names, transient network errors, and the like. Differences in such changing information between the two builds are referred to herein as nonsubstantive differences. For example, the following line of compiler output includes a date and time, which can vary between different invocations of the compiler based on the current date, and an error message, which indicates an error in the substance of the compilation:

6/5/2010 11:59:24 Error: Unsupported attribute header-value in <apex:dataTable> at line 6 column 12.

In one or more embodiments, such nonsubstantive differences are excluded when determining whether the compilation results differ, because the nonsubstantive differences do not indicate true differences between the two compilations. In one example, nonsubstantive differences are distinguished from substantive differences using pattern matching to find portions of the compiler output that match known patterns, and distinguishing the portions of text that match the patterns from the portions that do not match. The matching portions are the substantive differences, and the non-matching portions are the nonsubstantive differences when using a pattern such as a wildcard pattern or a regular expression that matches substantive differences. Alternatively, a pattern that matches nonsubstantive differences may be used to identify the nonsubstantive differences. A pattern that matches nonsubstantive differences can be understood as a negation or complement of a pattern that matches substantial differences.

For example, if the compiler output contains time stamps on lines of compiler output text, then the textual format of the time stamps can be determined and used to construct a pattern that matches the time stamps. A time stamp in the format shown above, e.g., 6/5/2010 11:59:24, can be identified by a wildcard pattern such as "*/*/* *:*:*" that matches date and time values in that format. Other techniques can be used for identifying nonsubstantive differences in other embodiments. Once the nonsubstantive differences have been identified, they can be excluded when determining if there are any substantive differences between the outputs of the two compilations.

The error information 172 presented in the user interface 170 can be used to trace the history of an error. For example, error details such as a stack trace, related pages, including one or more pages on which the error occurred, and other pages referenced by those pages can be viewed by a user to identify the cause of the error. To identify errors, the second build 136 of portions of the on-demand multi-tenant service environment, such as a build of a new version (e.g., new program code) or a re-build of a an existing version (e.g., existing code) can be tested for compatibility with a number of user-provided pages 106 and with the first build 134 by compiling the user provided pages 106 using the second build 136, and comparing the output of the compiler 122 produced for the first build 134 to the output of the compiler 122 produced for the second build 136. The second build 136 may include revised code libraries and/or a revised compiler 122. Any differences between the two builds can potentially indicate regression errors such as differences between output of the compiler 122 between the first and second builds 134, 136.

In one example, the compiler 122 generates a compiled form of an input page 108 if no compilation errors occur. The compiled form can be, for example, standard HTML, PDF, or the like. In one aspect, the compiler 122 can produce lower-severity messages, such as informational or warning messages, if no errors occur. These lower-severity messages do not necessarily indicate a failure of the compilation process, but could be treated similarly to error messages, and could be considered by the validation logic 100 in identifying regression errors, if desired. The input pages 106 are identified by querying the multi-tenant database for organizations 112 that have at least one page, and retrieving the pages for each such organization. In one example, the validation logic 100 obtains a user ID, name, and system administrator user ID for the organization's login account, and logs in to the account as an administrator user to gain access to the pages 106 associated with an organization 112. The pages 106 can then be passed to the compiler 122. In one example, an organization corresponds to a deployment of a system provided by Salesforce.com® with a defined set of licensed users, i.e., an organization is the virtual space provided to an individual customer of Salesforce.com®. A customer's organization includes the customer's data and applications, and is separate from other organizations.

In one or more embodiments, when the compiler 122 detects an error in its input pages 106, e.g., a syntax error or improper use of an interface in the page markup code, or a failure to locate or load code referenced by the page 108, the compiler generates an error message. The error can be a result of a mistake or error by the programmer who created the page. If the same page 108 is compiled against (i.e., using) the two different builds 134, 136, and the error only occurs with one of the builds, then the error is likely a problem with the build, e.g., an unexpectedly changed interface. The compiler 122 can stop the compilation process upon encountering an error, in which case at most one error message will be generated, or the compiler can continue the compilation process until the entire page has been processed, possibly stopping upon encountering a threshold number of errors.

In one or more embodiments, the compiler 122 generates error messages that describe the error in the form of text strings, error identifier codes, or the like. The compiler 122 can also produce an indication of the name of the page, class, or other type of compilation unit in which the error occurs. For example, if a page 108 includes a reference to an attribute of a component 110 (such as a data table), but the attribute is not defined in that component in the build 134 being referenced by the compiler 122, then the compiler generates an error message having text such as "Error: Unsupported attribute X in <apex:dataTable> at line L, column C," where X is the name of the referenced attribute and L and C are the line and column at which the error was detected in the page 108. The name <apex:dataTable> refers to a data table component of the page 108 defined in the page's a markup language description. The compiler 122 can also include the name of the page being compiled, e.g., "Catalog," with the error message, and other information related to the error, such as a stack trace and a label or number that identifies the error. The output of the compiler 122 is passed to a parser 124 and then to an uploader 126 to generate database objects 140 and errors 152, 154, as described in more detail below.

Figure 2:
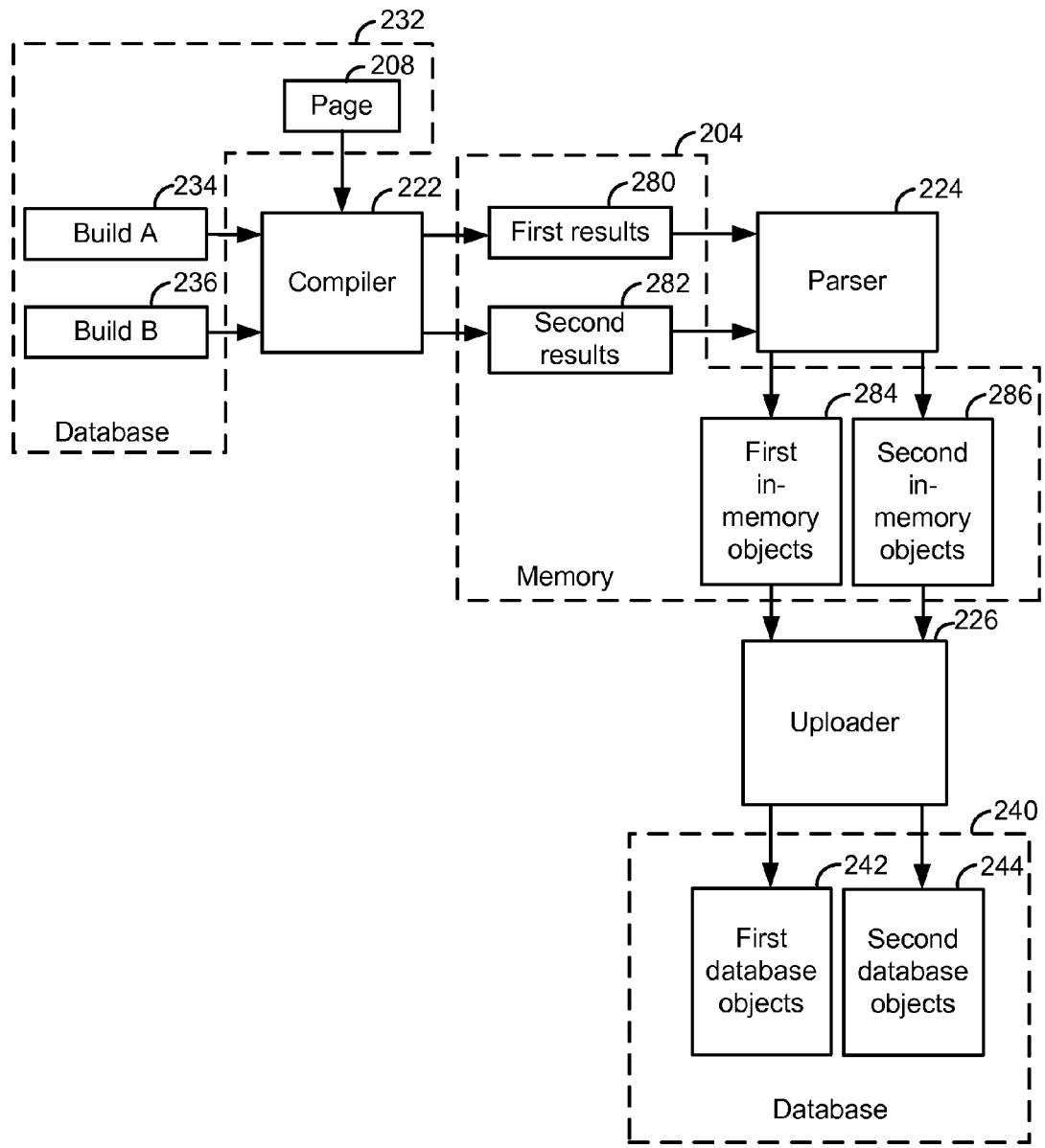
FIG. 2 shows a system diagram illustrating compiling, parsing, and uploading logic 220, in accordance with embodiments.

FIG. 2 shows a system diagram illustrating compiling, parsing, and uploading logic 220 in accordance with embodiments. In FIG. 2, a compiler 222 substantially similar to the compiler 122 of FIG. 1 generates error messages as first and second results 280, 282. The error messages can be represented as, for example, streams of characters accessible to other processes via inter-process communication, files, shared memory, or the like. The compilation results 280, 282 can be in any parsable format, such as Extensible Markup Language (XML), lines of text or other file formats. (XML is a markup language that enables the sharing and communication of structured data.) In XML, for example, the results can include a page identifier and release number associated with each error. The compiler 222 is invoked twice, once to generate the first results and once to generate the second results. A parser 224 receives error messages and/or other compiler output such as a stack trace, references to account and page, and performance output as the first results 280 of the first compilation, which uses a first build 234. The parser 224 translates the first results 280 to first in-memory objects 284 and sends the first in-memory objects 284 to an uploader 226 for storage as first database objects 242 in an on-demand multi-tenant database 240.

A subsequent invocation of the compiler 222 can generate the second results 282 using a second build 236. The parser 224 can translate the second results 282 to second in-memory objects 284 and send the in-memory objects to the uploader 226 for storage as second database objects 244 in the database 240. The database objects 242, 244 represent the compiler results for the first and second builds 234, 236, respectively. The database objects 242, 244 can be compared by compare logic 164 of an error selector 160 to identify regression errors 162 between the builds 234, 236. In other examples, a single invocation of the compiler 222 may compile the page 208 twice, once with reference to the first build 234, and a second time with reference to the second build 236. However, for simplicity of explanation, the compilations against the two builds are illustrated herein as separate invocations of the compiler 222.

The descriptions herein of processing the first results 280, first in-memory objects 284, and first database objects 242 apply similarly to the second results 282, second in-memory objects 286, and second database objects 244, which result from compiling the page 208 with reference to the second build 236. The first and second results 280, 282 produced by the compiler 222 can include descriptive information for each error, such as a page name, a page identifier, a stack trace, and an error message, and like. The results 280, 282 can include other information in other embodiments In one or more embodiments, the first and second builds 234, 236 and the page 208 are stored in a multi-tenant database 232. The first and second database objects 242, 244 are uploaded to a database 240, which can be the same database instance as the database 232, or an instance different from the database 240. The compiler results 280, 282 and the in-memory objects 284, 286 are stored in memory 204, e.g., random access memory.

Figure 3:
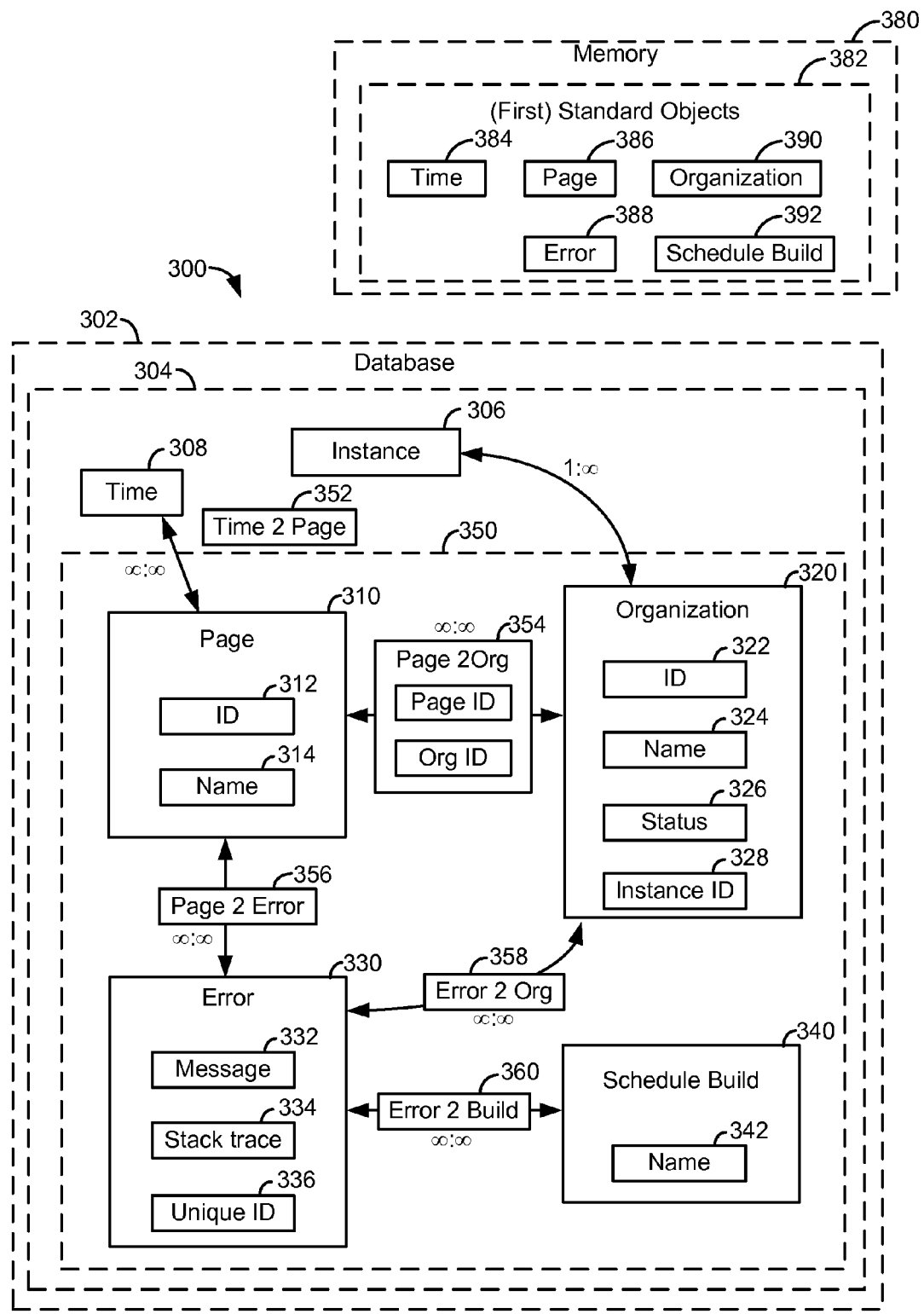
FIG. 3 shows a block diagram illustrating objects 300 generated by the validation logic 100, in accordance with embodiments.

FIG. 3 shows a block diagram illustrating objects 300 generated by the validation logic 100, including in-memory objects 382 stored in a memory 380 and database objects 304 stored in a database 302, in accordance with embodiments. The parser 224 generates an error object 330 for each error received from the compiler 222 shown in FIG. 2. In one example, the database objects 304 are created when the uploader 226 stores the first and second in-memory objects 284, 286 in the database 240. The attributes of the database objects 304 are similar to or the same as the attributes of the corresponding in-memory objects 382. Therefore, although the database objects 304 are described herein in more detail than the in-memory objects 382, the attribute descriptions are similarly applicable to the in-memory objects 382.

In one or more embodiments, each error object 330 includes an error message 332, a stack trace 334, and an error type 336, which are received from the compiler 122. The error object 300 can include additional or different information that describes the error in other embodiments. A page object 310 has an ID attribute 312 and a name attribute 314, which are set to the corresponding error information values received from the compiler 122 of FIG. 1. The parser 224 also generates a Page2Error relation object 356 for each error object 330 to relate the error 330 to a page 310 on which the error occurred. The relation object 356 includes identifiers of two related objects, and is also referred to as a junction object. A junction object is can be used to model a "many-to-many" relationship between two objects and can be implemented as, for example, a database object having fields for the object IDs of the related objects. Similar relation objects establish relations between other objects in the database 302, such as a Time2Page relation object 352 that establishes a relation between time objects 308 and page objects 310.

A page object 310 can be related to one or more organization objects 320, which identify the organization(s) that use or access the page 310. An organization object 320 includes, or references, an organization identifier 322, an organization name 324, an organization status 326, and a database instance identifier 328. In one example, each organization 320 is related to one or more pages 310 via a Page2Org object 354 for each such relation. Each organization 320 can be related to one or more errors 330, and, in the opposite direction, each error 330 can be related to one or more organizations 320 by an Error2Org object 358 that establishes a many-to-many relation. That is, each organization 320 can be associated with errors 330 that represent errors in pages compiled on behalf of that organization, e.g., pages of an application developed or used by that organization. Each organization object 320 is associated with one database instance object 306 by the organization's instance identifier 328, which represents the instance or pod of the multi-tenant database 130 in which the organization 320 and related objects 304 are stored. Each error object 330 is also associated with one or more scheduled build objects 340, which include a build name 342 that identifies a particular build 134. The build name 342 may be, for example, a name or version number of the software release, e.g., "164" for a release numbered "164". The many-to-many relation between errors 330 and scheduled builds 340 is represented by one or more Error2Build objects 360, one for each combination of a related error 330 and a scheduled build 340. These relations between objects can be used for validation in later stages to determine information about particular objects that is not stored directly in the objects as attributes. For example, the Error2Build relation 360 can be used to determine the build name 342 associated with a given error 330. Additionally, each page 310 is associated with one or more time objects 308, which represent the time taken for the page to compile.

In one example, an uploader 226 uploads, i.e., stores, the in-memory objects 382 in the on-demand multi-tenant database 130 to form the database objects 304. The uploader 226 creates or updates database tables to store the attributes of and relations between the database objects 304. The database operations can be performed using SQL insert and update statements to add or update rows in database tables that correspond to the types of database objects 302. For example, a page object 310 having identifier 312 and name 314 attributes can be stored as a row in a "Pages" database table with columns for the identifier and name. In other embodiments, a database abstraction interface can be used by the uploader 226 as an alternative to the SQL interface. In still other embodiments, an object relational mapping (ORM) tool can be used, in which case the database objects 304 are defined in the ORM tool. Using the ORM tool, setting the attributes of the in-memory objects 382 in the upload or implementation code would result in corresponding updates to the database table representations of the objects.

In one example, in which the database objects 304 are uploaded to the database 302 using SQL or another database abstraction interface without using an ORM tool, the database objects 304, including the relations, are uploaded in separate steps. A multi-step upload process is used in which objects are uploaded, the IDs assigned by the database are received, and the relation objects are updated with the new IDs. The multi-step process is used because the in-memory object IDs that refer to the in-memory objects 382 can differ from database object IDs assigned by the database, and the database object IDs do not become known until the database object has been submitted to the database or abstraction layer for storage.

Figure 4:
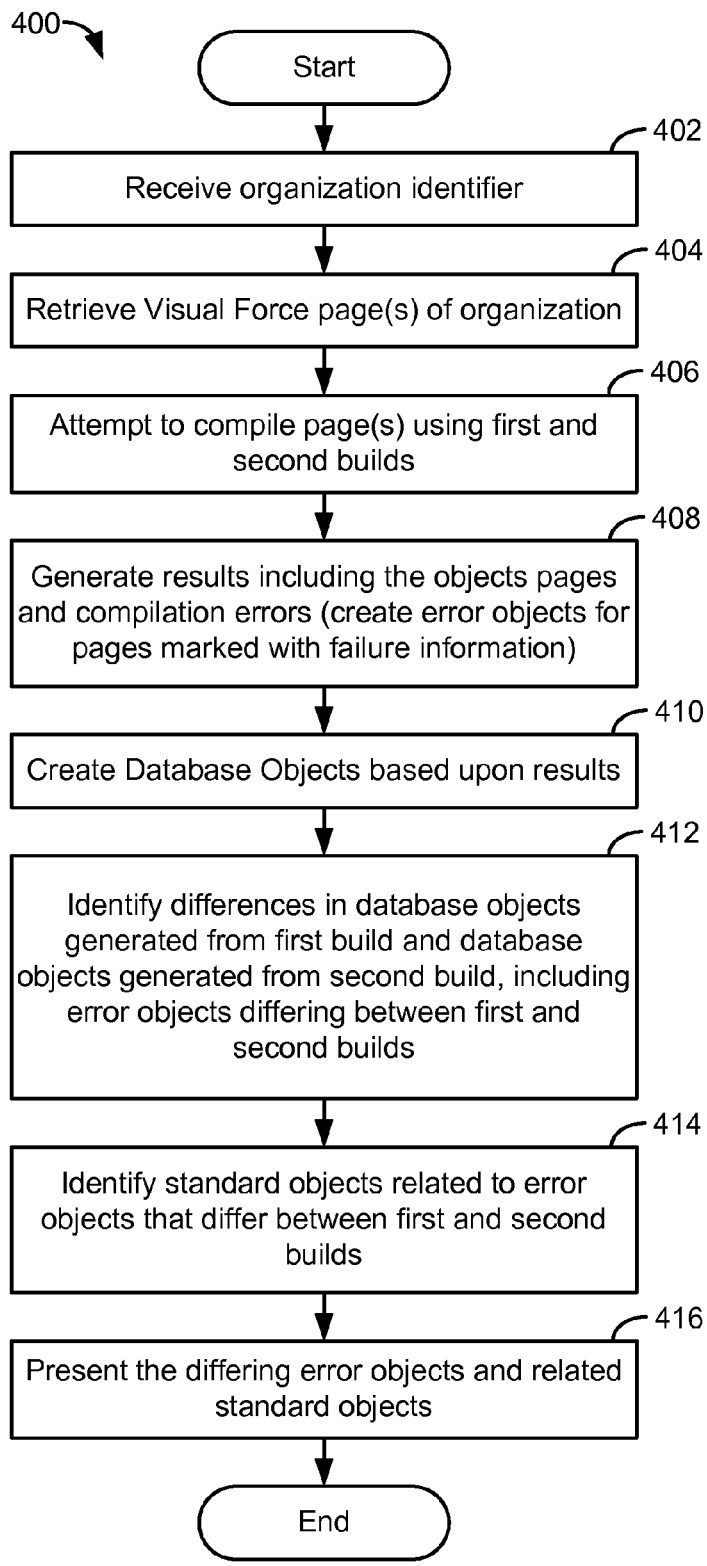
FIG. 4 shows a flow diagram of a method 400 for validating computer program code, in accordance with embodiments.

FIG. 4 shows a flow diagram of a method 400 for validating computer program code in accordance with embodiments. The validation method 400 begins at block 402 by receiving an organization identifier, which identifies the organization for which "old" and "new" builds are to be validated by compiling a page 108 of visual components. The two builds, also referred to as first and second builds, are provided as input to the validation method. The validation method identifies substantive differences between the results of compiling pages of the organization using the first build (e.g., with reference to the interface definitions provided by the first build) to results of compiling the same pages using the second build (e.g., with reference to the interface definitions of the second build). Block 404 retrieves the pages 106 of the organization. The pages 106 may be, for example, Visualforce pages. Block 406 invokes a page compiler 122, e.g., the Apex language compiler available from Salesforce.com®, to produce compilations of the pages. Apex is a programming language based on the Java programming language. The Apex language compiler translates computer program code from the Apex language to a representation (e.g., processor instructions and/or an intermediate representation) executable on Force.com platform servers. The Force.com platform is an on-demand multi-tenant service environment and is described in more detail below. The compiler 122 can be invoked once for the page with reference to the first build, and a second time for the same page with reference to the second build, as described above with respect to FIG. 1. Each of these two invocations of the compiler 122 may produce a compiled form of the page 108, such as an HTML page, if no errors are identified by the compiler. Other forms, such as the PDF or Flash® format, can be produced by the compiler 122 in other embodiments. If no errors are identified, the validation method exits without performing the subsequent steps. If at least one error is identified in the page 108 by the compiler 122 when compiling with the first build, block 408 creates the first result 280, which includes the identified error. Similarly, if at least one error is identified in the page 108 when compiling with the second build, block 408 creates the second result 282, which includes the identified error.

The first result 280 is used to generate first in-memory objects, and the second result 282 is used to generate second in-memory objects. At block 410, the in-memory objects are stored in the database 302, as described above with respect to the uploader 226 of FIG. 2. In one example, the first in-memory objects are stored in the database 302, thereby forming first database objects 242, which have the data attributes of the first in-memory objects, but with object identifiers assigned by the database. Similarly, the second in-memory objects are stored in the database to form second database objects 244, also with object identifiers assigned by the database.

In one example, a failure in compilation can be identified by querying the database 302 for pages that have been marked with error information by the compiler 122. If any error information is present in the compilation results, block 408 generates first database objects 242 if the error occurred with reference to the first build, and generates second database objects 244 if the error occurred with reference to the second build. The database objects 242, 244 include error objects with attributes based on the compiler errors, and are related to page objects representing the referencing pages on which the errors occurred. The page objects are associated (via relation objects) with error objects that represent the errors identified on the page.

Block 412 compares the attributes of the first database objects 242 with those of the second database objects 244 to identify substantive differences between the two sets of objects. Substantive differences are potential regression errors. In one example, differences between the attributes of error objects (e.g., error ID, name, label, stack trace) of the first and second database objects are presented as regression errors at block 416 (as described above with respect to the error selector 160 and the error presentation interface 170 of FIG. 1). In one example, nonsubstantive differences in the text of these attributes are identified and ignored. A format matching technique such as that described above with respect to FIG. 1 can be used to distinguish nonsubstantive differences from substantive differences. Alternatively, certain attributes such as time stamps or other information not related to compilation results can be designated as nonsubstantial. Differences between values of these designated nonsubstantive attributes can be ignored when determining if there are differences between the two sets of objects. Block 414 identifies the standard objects, e.g., pages 386 and other objects 382 shown in FIG. 3, that are related to the errors identified in block 412. Block 416 presents the error objects and related standard objects on a display device. In some embodiments, standard objects may include programming objects in programming code and/or one or more databases. The standard objects may be defined by the provider of the on-demand service environment.

Figure 5:
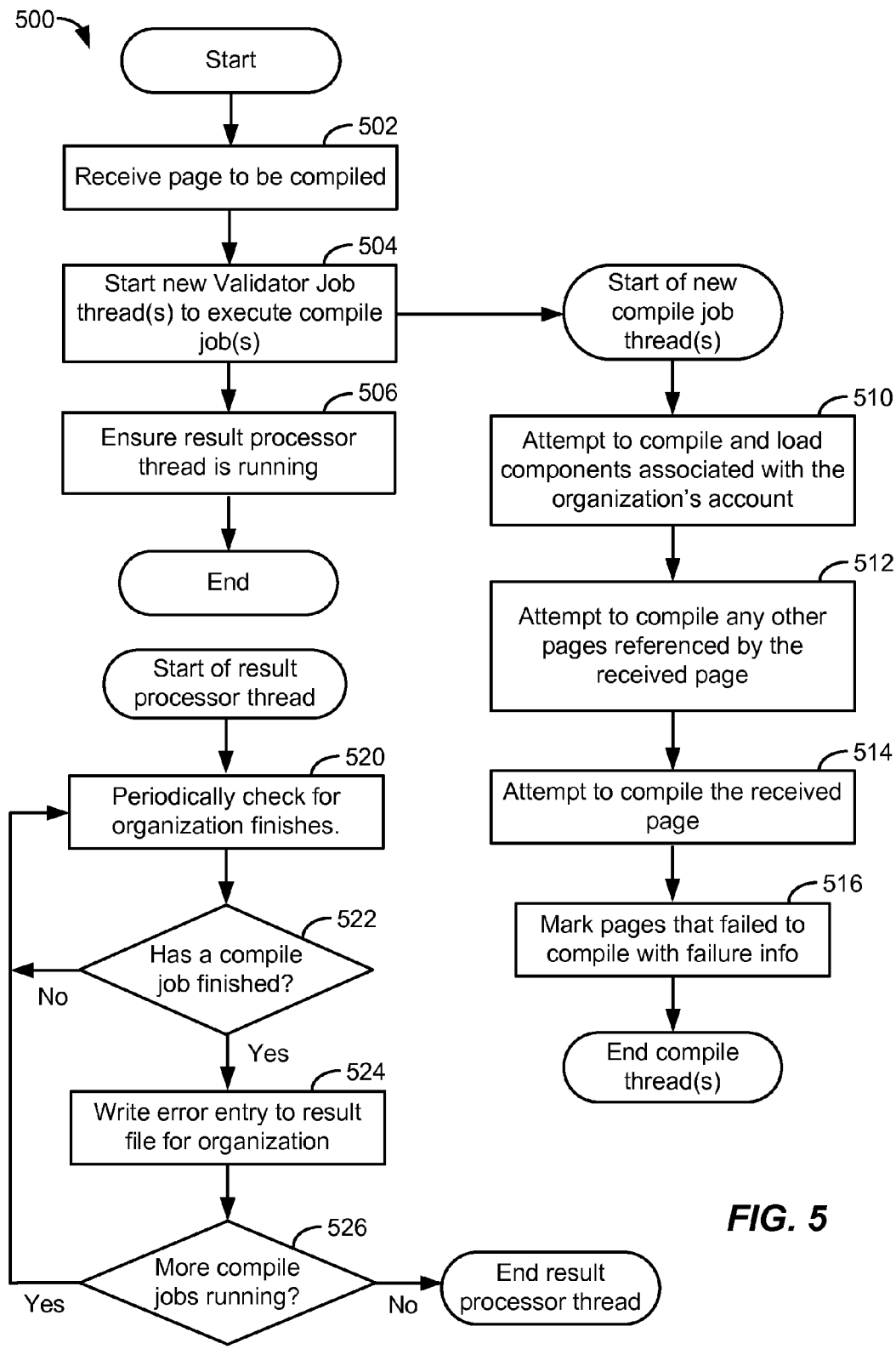
FIG. 5 shows a flow diagram of a method 500 for compiling computer program code, in accordance with embodiments.

FIG. 5 shows a flow diagram of a method 500 for compiling computer program code, in accordance with embodiments. The method 500 can be used to invoke the compiler 122 of FIG. 1. Block 502 receives a list of organizations 112. In one example, the method 500 is executed in an administrator user account, which has access to the pages and database tables of the organization associated with the page 108. The compiler 122 can use multiple threads of execution to reduce compilation time by executing different portions of the compilation process (e.g., compilation of different pages referenced by the page 108) concurrently on different processors.

Block 504 starts a new thread of control that executes a Validator Job to compile the page 108, as described above with respect to FIG. 2. A Validator Job may act as a worker thread that performs login, query, and compile operations of Visualforce pages in an organization. According to FIG. 2, a list of organizations is passed to 502. The Validator Job may check whether an organization is available. If so, the Validator Job may execute the process mentioned. If no organization is available, the Validator Job may end itself. Additional threads can be created, up to a defined limit (e.g., 4) to compile multiple pages and/or components concurrently.

Block 506 verifies that a result processor thread, which processes the results of completed Validator Jobs, is running.

If the result processor thread is not running, block 506 starts it. Each compile thread created at block 504 begins execution at block 510. These compile threads can execute concurrently with each other and with other processing, such as the result processor thread. At block 510, a compile thread attempts to compile and load the components associated with the login account of the organization of the page that was received at block 502. When components are loaded, they may be retrieved from the database, compiled, and/or made available to use. Block 512 attempts to compile any other pages referenced by the page 108, e.g., other pages referenced by hyperlinks on the page 108. Block 514 attempts to compile the page 108. If the compilation fails, e.g., produces errors, then the page 108 is associated with or marked with information about the compilation errors. The results of the compilation are made available to the result processor thread by storing the results in a memory location identified by a queue entry in a queue of completed jobs, or, alternatively, in a file accessible by the result processor thread. The result processor thread periodically (e.g., every 3 seconds, or at another defined interval) checks for organizations for which compiles have finished, e.g., by checking for new queue entries in the completed job queue, or checking a particular memory location or file. If block 522 determines that a compile process has finished, block 524 removes the object that corresponds to the finished process from the queue. If no compile job is in a finished state, the processor thread returns to block 520 and continues to periodically check for compilations that are in the finished state (e.g., are in the completed job queue). Block 524 processes the results of each finished compilation job by writing an entry in a result file for the organization. Block 524 may write the failure information that was associated with the page at block 516 to the result file, or store the failure information in a memory object associated with the organization. Block 526 transfers control back to block 520 to process the results of another compile job if at least one compile job is running. If no compile jobs associated with the organization are running, the processor thread ends.

Figure 6:
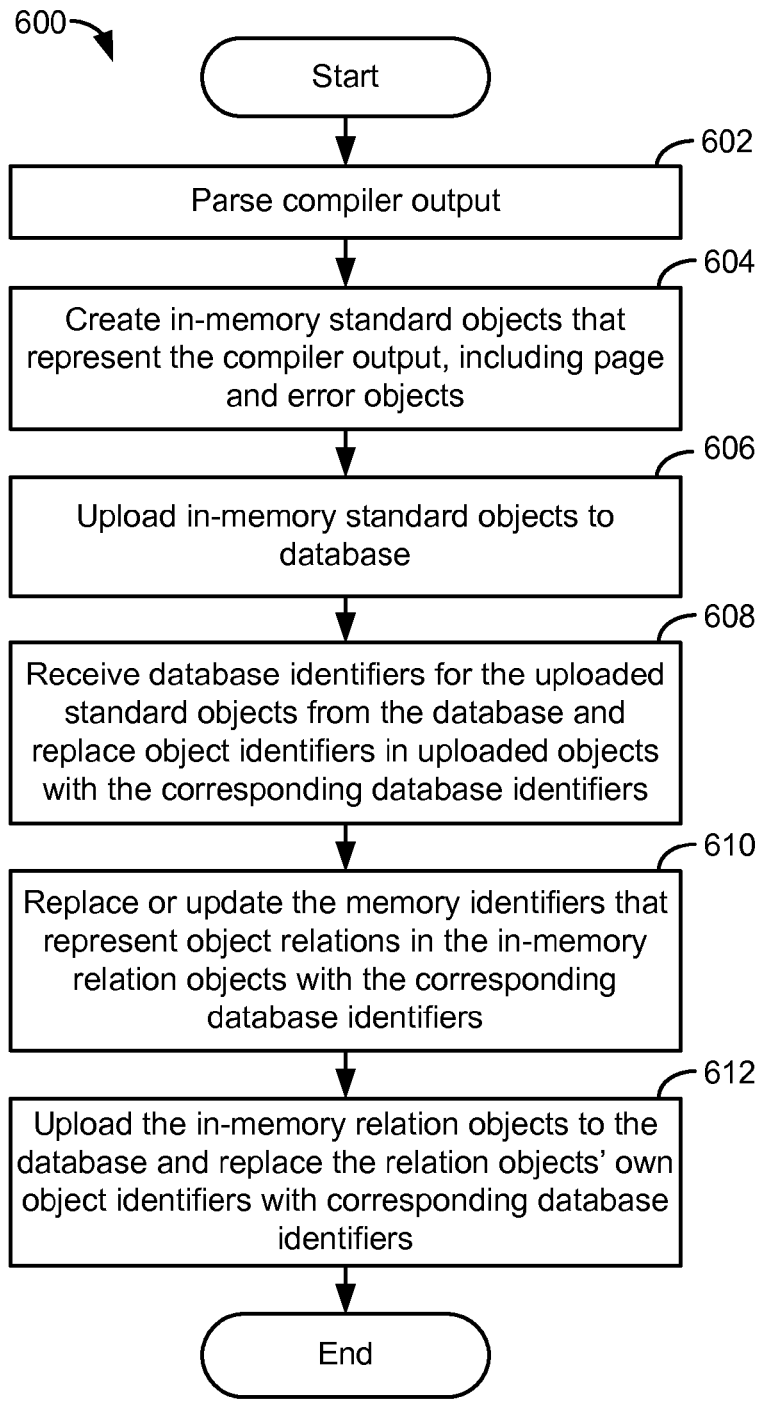
FIG. 6 shows a flow diagram of a method 600 for uploading computer program code, in accordance with embodiments.

FIG. 6 shows a flow diagram of a method 600 for uploading computer program code, in accordance with embodiments. Block 602 parses output of the compiler 122, and block 604 creates the in-memory objects 382. More particularly, the in-memory objects 382, including the times 384, pages 386, organizations 390, errors 388, and scheduled builds 392, are stored in corresponding time, page, organization, error, and scheduled build tables of the database 302. The attributes of each of these objects are stored by block 606. The unique ID attributes of the objects are then assigned new values, which are database IDs provided by the database for the objects. Block 608 stores these new IDs in the database tables, e.g., in an ID field in a Page table, in place of the memory identifiers. References in the in-memory objects 382 to other in-memory objects 382 are also replaced with corresponding references to database relation objects 354-360 at block 610. The in-memory relation objects are then uploaded to the database at block 612. Once the in-memory objects 382 have been uploaded to the database, they can be de-allocated and removed from memory. The validator can subsequently retrieve the database objects 304 from the database 302.

Figure 7:
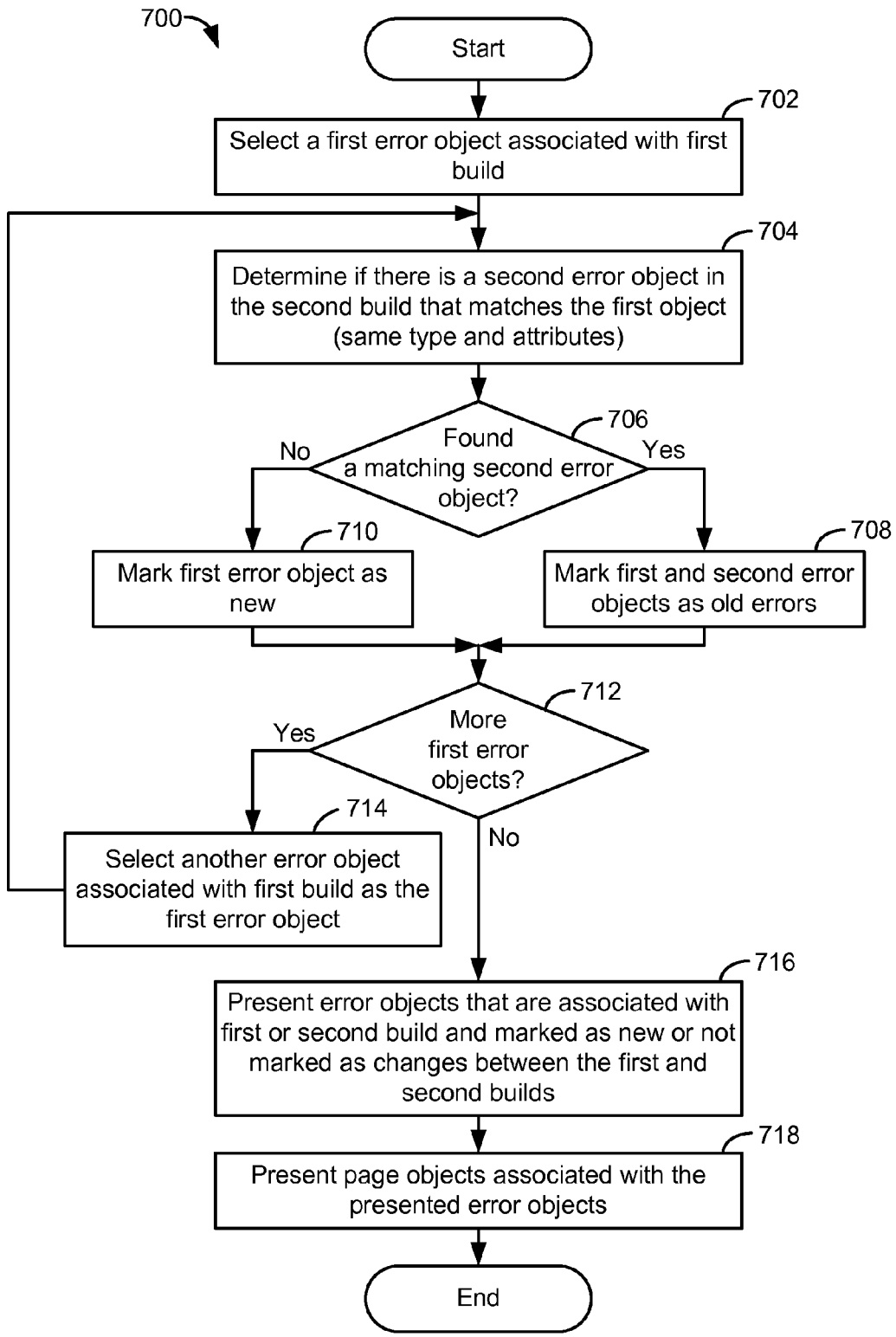
FIG. 7 shows a flow diagram of a method 700 for identifying and presenting errors, in accordance with embodiments.

FIG. 7 shows a flow diagram of a method 700 for identifying and presenting errors, in accordance with embodiments. The process of FIG. 7 can be implemented by, for example, computer program code instructions encoded on a computer readable medium and executable by a processor. The results produced by the compiler 122 are analyzed by an error filter 150, which queries the database 302 for the error objects 330 associated with a particular organization 320 and produced by the compiler with reference to two different builds 340, build A and build B. An error selector 160 compares the error objects identified by the error filter 150 and identifies substantive differences between the build A and build B error objects. Block 702 applies a filter to the error objects 330 stored in the database 302 of FIG. 3 to identify errors that occurred in a given scheduled build 340. For example, to identify error objects generated by the compiler 122 for a build named "164", the error filter 150 selects error objects (e.g., rows of an error table in the database 302) that are related to the scheduled build 340 that has the name "164". The error objects can further be filtered based on the organization 320 to limit the identified error objects to those associated with a particular organization 320. In that case, the error filter 150 adds a further condition, e.g., that the identified error objects are related to the organization object 320 that corresponds to the desired organization. Upon identifying a first error object, the error filter determines at block 704 if there is a second error object in the database related to the second build and having the same organization as the first error, such that the second error object matches the first error object, e.g., is substantively the same as the first error object. In one or more embodiments, two error objects match each other if they both have substantively the same unique ID 336, message 332, and stack trace 334. Other criteria can be used in addition to or in place of the aforementioned example criteria. Matching criteria for determining whether two errors are substantively the same can be defined to be true when the two error objects being compared represent errors that are considered to be the same, i.e., unchanged, for the purposes of checking for regression errors. Block 706 determines if a matching error has been found for the first error. If a match is found, block 704 marks the first and second errors so that they will not be considered again during this execution of the process. For example, block 708 can mark both of the error objects as old, or add them to a data structure such as a table or list of errors that occurred in both builds. If a match is not found, block 710 marks the first error object as new (or, alternatively, does nothing, or adds the first error object to a table of errors that occurred in the first build but not in the second, depending on the details of the particular implementation). Block 712 determines if there is another unconsidered error object associated with the first build. Unconsidered objects are those that have not yet been processed by block 702-704, e.g., objects that have not been marked old or new. If there is another unconsidered error object, block 714 selects it, and execution continues at block 704 with the newly selected error object as the first error object. If block 712 determines that there are no more unconsidered error objects, execution continues at block 716, which presents the error objects that differ between the two builds or are in one of the builds but not the other. Block 716 thus presents error objects that are related to either build A or build B and are not marked as old. Block 718 presents the page objects 310 that are related to the presented error objects. This presentation can be, for example, in a graphical user interface displayed in a web browser on a display device such as a computer screen. The error objects can be displayed in the user interface with a message, stack trace, and error ID displayed in an expanded or expandable view of a list of errors. The expanded view can also include a link or reference to the page 310 related to the error 330. In one example, the page 310 is the page that was being compiled when the compiler generated the error 330. Steps 716 and 718 correspond to the error presentation interface 170 of FIG. 1. The error presentation interface 170 displays the organization ID, the page name, the page markup, and a stack trace useful to a user in diagnosing and determining the cause of the error. Other information may also be presented, e.g., metadata associated with the page 310. The pages related to the page 310 can be accessed via links in the user interface, so that the history of the error 310 can be traced to identify and diagnose the cause of regression errors.

Figure 8:
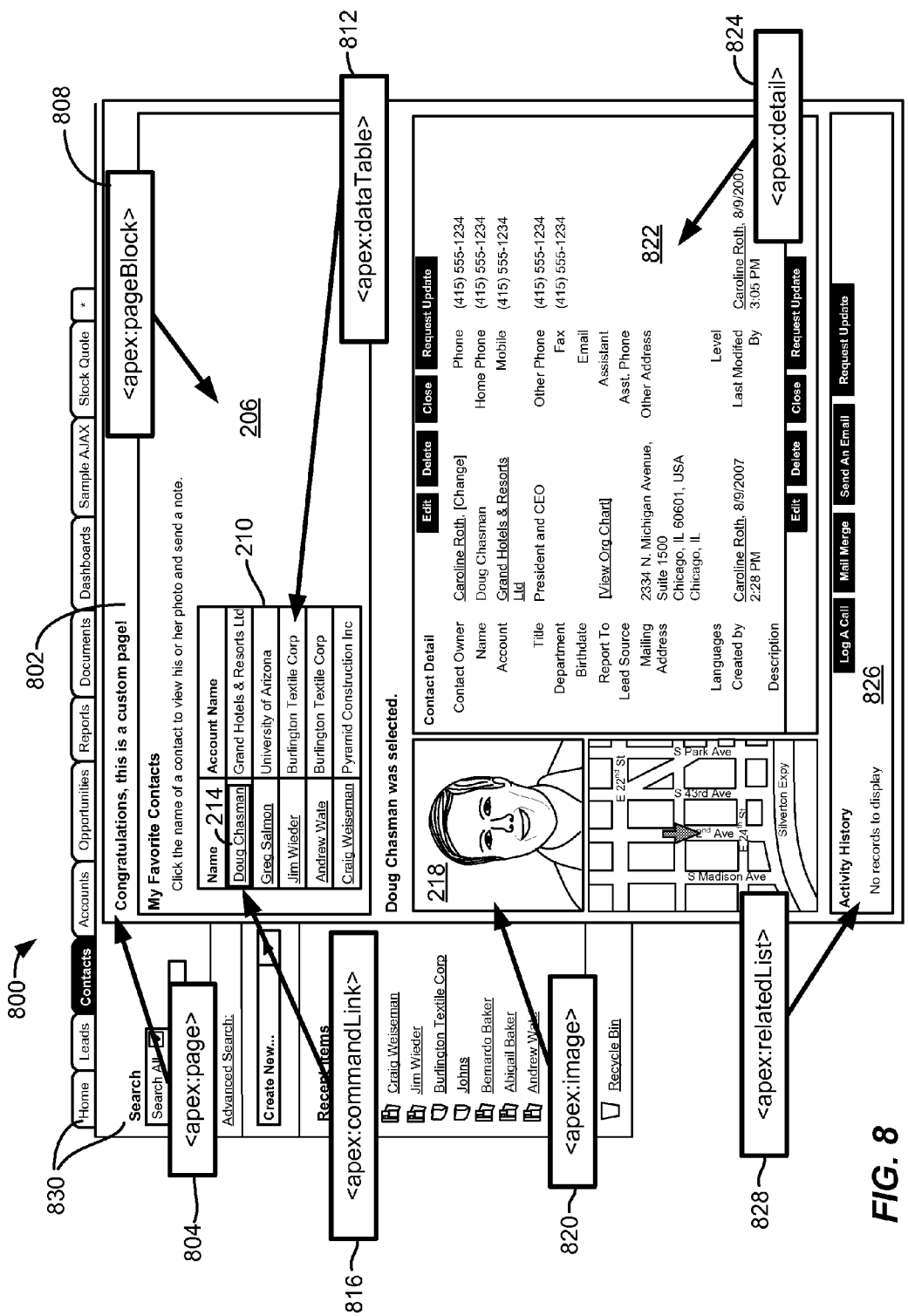
FIG. 8 shows a user interface 800 having visual components in an on-demand multi-tenant service environment, in accordance with embodiments.

FIG. 8 shows a user interface 800 having visual components in an on-demand multi-tenant service environment, in accordance with embodiments. A user interface page 800 includes several Visualforce components, including an Apex page 804, an Apex page block 808, an Apex data table 812, an Apex command link 816, an Apex image 820, an Apex detail 824 component, and an Apex related list 828. These user interface components correspond to the visual components 110, and the Apex page 804 corresponds to the page 108 of FIG. 1.

As described above, a user interface page is, in one example, a web page created using the Visualforce page development tool available from Salesforce.com®. Such pages can, for example, present information relevant to an organization and modify or capture data. Pages can be rendered as, for example, HTML documents in a web browser, PDF documents, or email attachments, and can be associated with Cascading Style Sheet (CSS) styles. A Visualforce user interface component can be added to a user interface page with an associated set of attribute tags, for example, <apex: detail>. Visualforce includes a number of component types, such as input fields, text fields, tables, and the like, and users can create additional custom components. For example, a user interface page can be defined using a markup language, as shown below:

```
<apex:page standardStylesheets="false"
    showHeader="false" sidebar="false"
    standardController="Merchandise_c" recordSetVar="products">
    <apex:stylesheet value="{!URLFOR($Resource.styles,
    'styles.css')}" />
    <h1>Merchandise Catalog</h1>
        <apex:dataTabel value="{!products}"
        var="pitem" rowClasses="odd,even">
            <apex:dataTable headerValue="Product">
                <apex:outputText value="{!pitem.name}"/>
            </apex:dataTable>
            <apex:column headerValue="Product">
                <apex:outputText value="{!pitem.name}"/>
            </apex:column>
            <apex:column headerValue="Description">
                <apex:outputField value="{!pitem.Description_c}"/>
            </apex:column>
            <apex:column headerValue="Price">
                <apex:outputField value="{!pitem.Price_c}"/>
            </apex:column>
        </apex:dataTable>
        <br/>
</apex:page>
```

Further, as described above, a regression error represents a difference in the errors that result when compiling a page with reference to two different builds. Regression errors are useful for identifying differences between the two different builds. Therefore, if an error occurs when compiling a page with respect to both builds, that error is not considered to be a regression error, because it does not represent a difference between the two builds.

In one example, a particular compilation error can occur when compiling a page with reference to the second build but not the first build, in which case a regression error has occurred, and an Error object is created. For example, when compiling the above page with reference to the second build, the compiler 122 produces the error message "Compiler error: <apex:dataTabel." An Error object is created with the text "Error: Unknown component apex:datatabel" and the error object is related to the page's name ("Component"). However, in this example, the error does not occur when compiling the page with reference to the first build (e.g., because the first build defines a dataTabel component). Because the error does not occur for both builds, there is a regression error.

In another example, a compilation error occurs in both the first and second builds, in which case a regression error has not occurred, because there is no difference between the error in the first and second builds. For example, when compiling the above page with the correct spelling of dataTable, the compiler 122 produces the error message "Error: Unsupported attribute headervalue in <apex:dataTable> at line 6 column 12." In this example, neither the first build nor the second build allows an attribute named headervalue in the apex:dataTable component. Since there is no substantive difference between the error messages produced for the two builds, there is no regression error, and an Error object is not created.

In one or more embodiments, Visualforce is a framework for creating user interfaces, and enables interface designs and interactions to be built and delivered in the cloud. The user interfaces built with Visualforce can extend the default Force.com platform look and feel, or replace it with a different style and set of interactions. Because Visualforce markup is can be rendered into HTML, designers can use Visualforce tags alongside standard HTML, JavaScript™ code, Flash® code, or any other code that can execute within an HTML page on the Force.com platform. The behavior of Visualforce components can be controlled by the same logic that is used in pages provided by Salesforce.com®, or by user-defined logic written in the Apex programming language. The Apex language is based on the Java programming language and is designed for building business applications to manage data and processes in the context of the Force.com platform. Apex code is a strongly-typed, object-oriented programming language that allows developers to execute flow and transaction control statements on the Force.com platform server in conjunction with calls to the Force.com API. Using syntax that similar to Java and executing similarly to database stored procedures, Apex code enables developers to add business logic to most system events, including button clicks, related record updates, and Visualforce user interface pages. Apex scripts can be initiated by Web service requests and from triggers on objects.

In one or more embodiments, metadata can include information about the structure, appearance, and functionality of an organization and any of its parts. Force.com uses XML to describe metadata. Force.com components that are retrieved or deployed as metadata are represented by XML definitions. A field or attribute can be a part of an object that holds a specific piece of information, such as a text or currency value.

In one aspect, an Apex class can be understood as a template or blueprint from which Apex objects are created. Classes can include other classes, user-defined methods, variables, exception types, and static initialization code. In most cases, Apex classes are modeled on their counterparts in Java. In one example, an instance is a cluster of software and hardware represented as a single logical server that hosts an organization's data and runs their applications. The Force.com platform can run on multiple instances, with data for particular organization consolidated at a single instance.

Figure 9A:
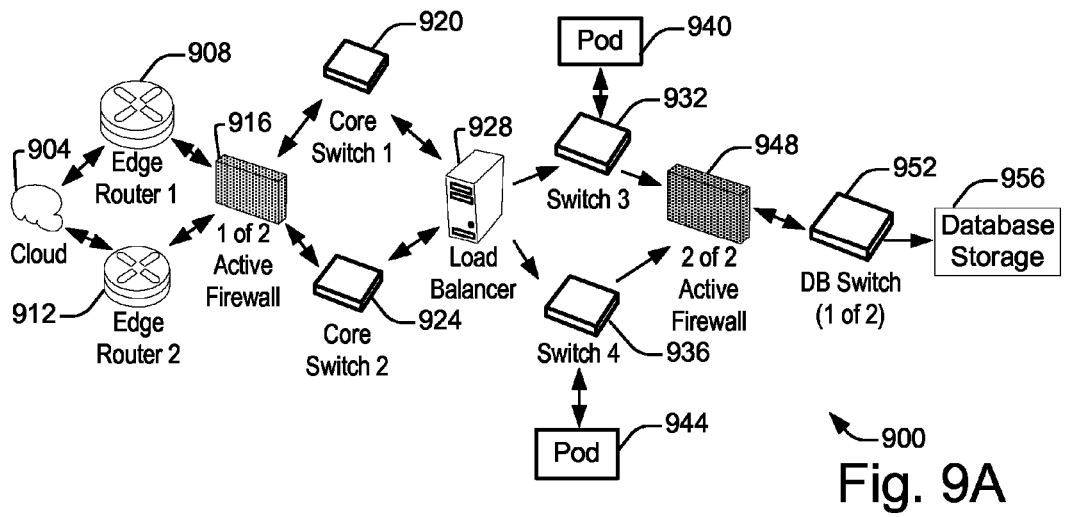
FIG. 9A shows a system diagram 900 having architectural components in an on-demand service environment, in accordance with embodiments.

FIG. 9A shows a system diagram 900 illustrating architectural components of an on-demand service environment, in accordance with one embodiment.

A client machine located in the cloud 904 (or Internet) may communicate with the on-demand service environment via one or more edge routers 908 and 912. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand service environment may communicate with a database storage system 956 via a database firewall 948 and a database switch 952.

Figure 9B:
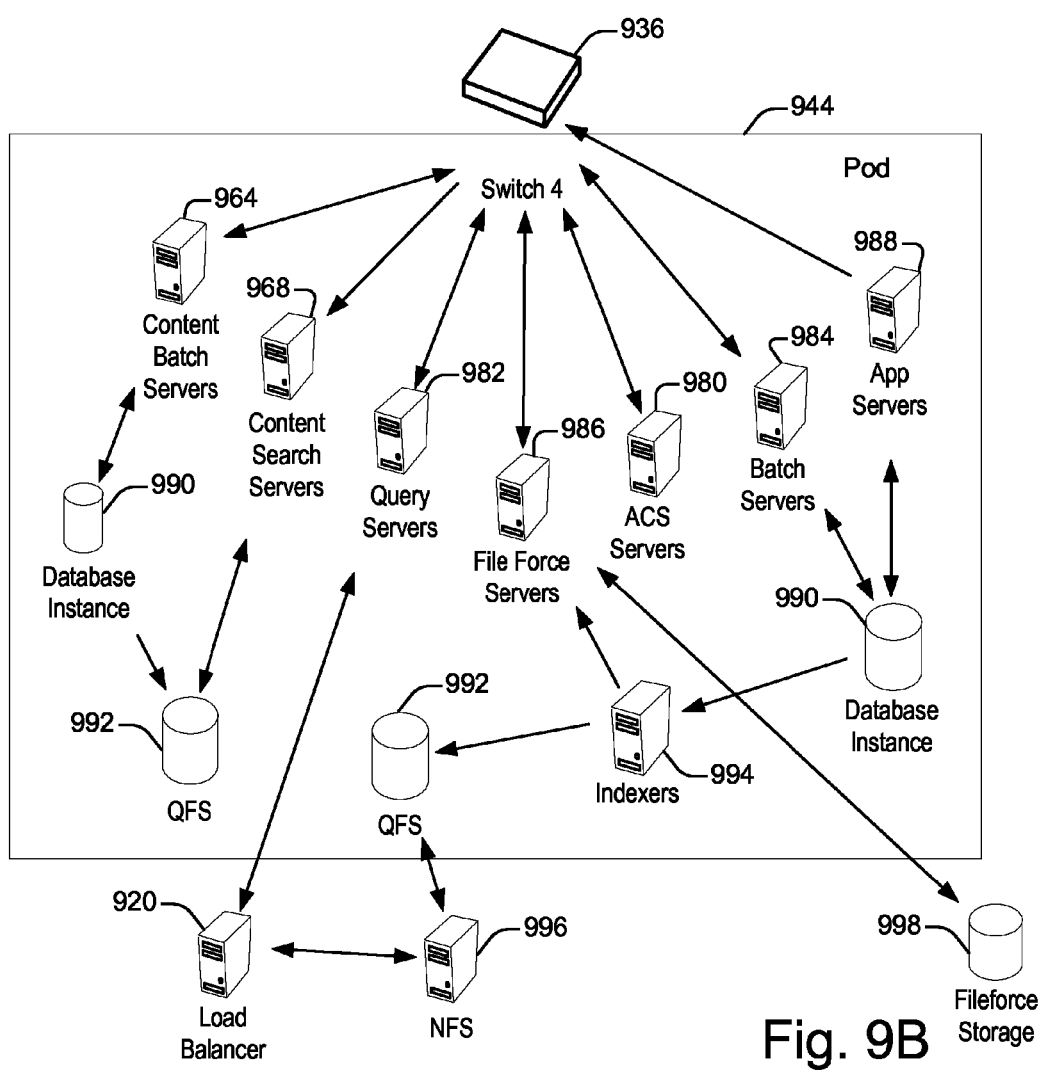
FIG. 9B shows the architecture of a pod 944, in accordance with embodiments.

As shown in FIGS. 9A and 9B, accessing an on-demand service environment may involve communications transmitted among a variety of different hardware and/or software components. Further, the on-demand service environment 900 is a simplified representation of an actual on-demand service environment. For example, while only one or two devices of each type are shown in FIGS. 9A and 9B, some embodiments of an on-demand service environment may include anywhere from one to many devices of each type. Also, the on-demand service environment need not include each device shown in FIGS. 9A and 9B, or may include additional devices not shown in FIGS. 9A and 9B.

Moreover, one or more of the devices in the on-demand service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or plurality of data networks, often including the Internet. Client machines located in the cloud 904 may communicate with the on-demand service environment to access services provided by the on-demand service environment. For example, client machines may access the on-demand service environment to retrieve, store, edit, and/or process information.

In some embodiments, the edge routers 908 and 912 route packets between the cloud 904 and other components of the on-demand service environment 900. The edge routers 908 and 912 may employ the Border Gateway Protocol (BGP). The BGP is the core routing protocol of the Internet. The edge routers 908 and 912 may maintain a table of IP networks or 'prefixes' which designate network reachability among autonomous systems on the Internet.

In one or more embodiments, the firewall 916 may protect the inner components of the on-demand service environment 900 from Internet traffic. The firewall 916 may block, permit, or deny access to the inner components of the on-demand service environment 900 based upon a set of rules and other criteria. The firewall 916 may act as one or more of a packet filter, an application gateway, a stateful filter, a proxy server, or any other type of firewall.

In some embodiments, the core switches 920 and 924 are high-capacity switches that transfer packets within the on-demand service environment 900. The core switches 920 and 924 may be configured as network bridges that quickly route data between different components within the on-demand service environment. In some embodiments, the use of two or more core switches 920 and 924 may provide redundancy and/or reduced latency.

In some embodiments, the pods 940 and 944 may perform the core data processing and service functions provided by the on-demand service environment. Each pod may include various types of hardware and/or software computing resources. An example of the pod architecture is discussed in greater detail with reference to FIG. 9B.

In some embodiments, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some embodiments, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some embodiments, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some embodiments, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some embodiments, communication with the database storage system 956 may be conducted via the database switch 952. The multi-tenant database system 956 may include more than one hardware and/or software components for handling database queries. Accordingly, the database switch 952 may direct database queries transmitted by other components of the on-demand service environment (e.g., the pods 940 and 944) to the correct components within the database storage system 956.

In some embodiments, the database storage system 956 is an on-demand database system shared by many different organizations. The on-demand database system may employ a multi-tenant approach, a virtualized approach, or any other type of database approach. An on-demand database system is discussed in greater detail with reference to FIGS. 10 and 11.

FIG. 9B shows a system diagram illustrating the architecture of the pod 944, in accordance with one embodiment. The pod 944 may be used to render services to a user of the on-demand service environment 900.

In some embodiments, each pod may include a variety of servers and/or other systems. The pod 944 includes one or more content batch servers 964, content search servers 968, query servers 972, file force servers 976, access control system (ACS) servers 980, batch servers 984, and app servers 988. Also, the pod 944 includes database instances 990, quick file systems (QFS) 992, and indexers 994. In one or more embodiments, some or all communication between the servers in the pod 944 may be transmitted via the switch 936.

In some embodiments, the application servers 988 may include a hardware and/or software framework dedicated to the execution of procedures (e.g., programs, routines, scripts) for supporting the construction of applications provided by the on-demand service environment 900 via the pod 944. Some such procedures may include operations for providing the services described herein.

The content batch servers 964 may requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand service environment.

The Fileforce servers 976 may manage requests information stored in the Fileforce storage 978. The Fileforce storage 978 may store information such as documents, images, and basic large objects (BLOBs). By managing requests for information using the Fileforce servers 976, the image footprint on the database may be reduced.

The query servers 972 may be used to retrieve information from one or more file systems. For example, the query system 972 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may require various hardware and/or software resources. In some embodiments, the ACS servers 980 may control access to data, hardware resources, or software resources.

In some embodiments, the batch servers 984 may process batch jobs, which are used to run tasks at specified times. Thus, the batch servers 984 may transmit instructions to other servers, such as the app servers 988, to trigger the batch jobs.

In some embodiments, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some embodiments, one or more query servers 972 may communicate with the NFS 996 to retrieve and/or update information stored outside of the pod 944. The NFS 996 may allow servers located in the pod 944 to access information to access files over a network in a manner similar to how local storage is accessed.

In some embodiments, queries from the query servers 922 may be transmitted to the NFS 996 via the load balancer 920, which may distribute resource requests over various resources available in the on-demand service environment. The NFS 996 may also communicate with the QFS 992 to update the information stored on the NFS 996 and/or to provide information to the QFS 992 for use by servers located within the pod 944.

In some embodiments, the pod may include one or more database instances 990. The database instance 990 may transmit information to the QFS 992. When information is transmitted to the QFS, it may be available for use by servers within the pod 944 without requiring an additional database call.

In some embodiments, database information may be transmitted to the indexer 994. Indexer 994 may provide an index of information available in the database 990 and/or QFS 992. The index information may be provided to file force servers 976 and/or the QFS 992.

Figure 10:
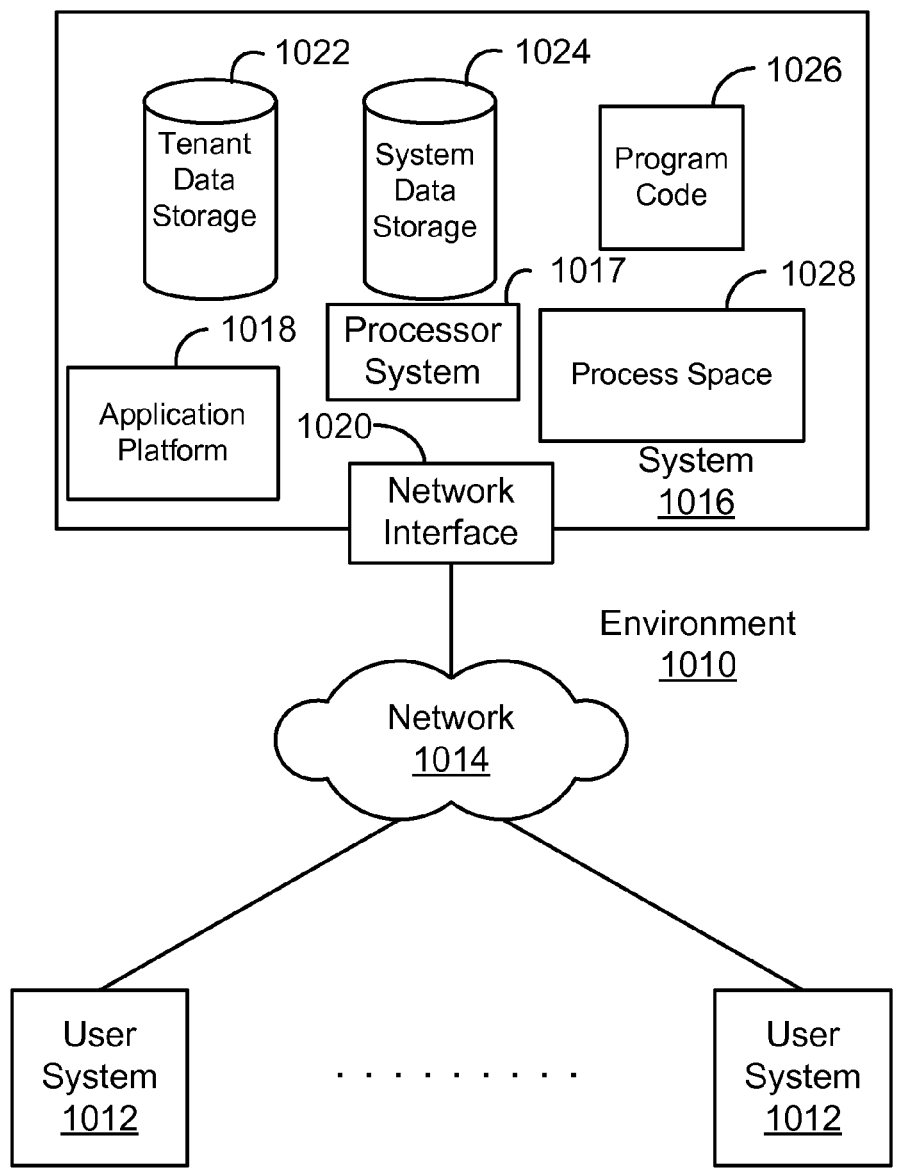
FIG. 10 shows an environment 1010 in which an on-demand database service can be used in accordance with embodiments.

FIG. 10 shows a block diagram of an environment 1010 wherein an on-demand database service might be used, in accordance with one embodiment.

Figure 11:
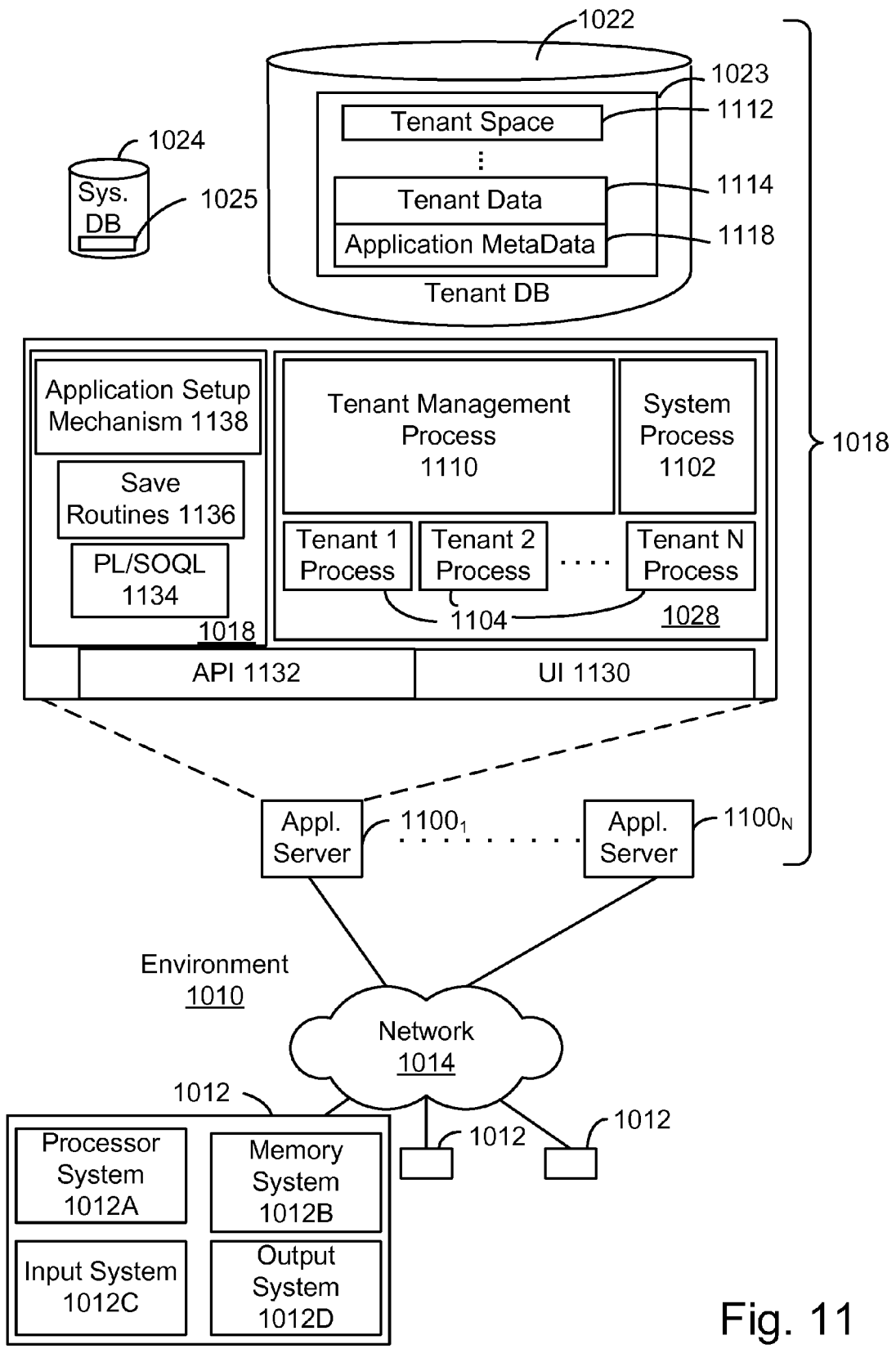
FIG. 11 shows a system and various interconnections, in accordance with embodiments.

Environment 1010 includes an on-demand database service 1016. User system 1012 may be any machine or system that is used by a user to access a database user system. For example, any of user systems 1012 can be a handheld computing device, a mobile phone, a laptop computer, a work station, and/or a network of computing devices. As illustrated in FIGS. 10 and 11, user systems 1012 might interact via a network 1014 with the on-demand database service 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 1016" and "system 1016" will be used interchangeably herein. A database image may include one or more database objects. A relational database management system (RDBMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

One arrangement for elements of system 1016 is shown in FIG. 10, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

The users of user systems 1012 may differ in their respective capacities, and the capacity of a particular user system 1012 might be entirely determined by permissions (permission levels) for the current user. For example, where a call center agent is using a particular user system 1012 to interact with system 1016, the user system 1012 has the capacities allotted to that call center agent. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10, implements a web-based customer relationship management (CRM) system. For example, in one embodiment, system 1016 includes application servers configured to implement and execute CRM software applications as well as provide related data, code, forms, web pages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications. User (or third party developer) applications, which may or may not include CRM, may be supported by the application platform 1018, which manages creation, storage of the applications into one or more database objects and executing of the applications in a virtual machine in the process space of the system 1016.

Each user system 1012 could include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1012 to access, process and view information, pages and applications available to it from system 1016 over network 1014.

Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application (s) including computer code to run using a central processing unit such as processor system 1017, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 1016 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 1016 is configured to provide web pages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 11 also shows a block diagram of environment 1010 further illustrating system 1016 and various interconnections, in accordance with one embodiment. FIG. 11 shows that user system 1012 may include processor system 1012A, memory system 1012B, input system 1012C, and output system 1012D. FIG. 11 shows network 1014 and system 1016. FIG. 11 also shows that system 1016 may include tenant data storage 1022, tenant data 1023, system data storage 1024, system data 1025, User Interface (UI) 1130, Application Program Interface (API) 1132, PL/SOQL 1134, save routines 1136, application setup mechanism 1138, applications servers 11001-1100N, system process space 1102, tenant process spaces 1104, tenant management process space 1110, tenant storage area 1112, user storage 1114, and application metadata 1116. In other embodiments, environment 1010 may not have the same elements as those listed above and/or may have other elements instead of, or in addition to, those listed above.

User system 1012, network 1014, system 1016, tenant data storage 1022, and system data storage 1024 were discussed above in FIG. 10. Regarding user system 1012, processor system 1012A may be any combination of processors. Memory system 1012B may be any combination of one or more memory devices, short term, and/or long term memory. Input system 1012C may be any combination of input devices, such as keyboards, mice, trackballs, scanners, cameras, and/or interfaces to networks. Output system 1012D may be any combination of output devices, such as monitors, printers, and/or interfaces to networks. As shown by FIG. 11, system 1016 may include a network interface 1020 (of FIG. 10) implemented as a set of HTTP application servers 1100, an application platform 1018, tenant data storage 1022, and system data storage 1024. Also shown is system process space 1102, including individual tenant process spaces 1104 and a tenant management process space 1110. Each application server 1100 may be configured to tenant data storage 1022 and the tenant data 1023 therein, and system data storage 1024 and the system data 1025 therein to serve requests of user systems 1012. The tenant data 1023 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1130 provides a user interface and an API 1132 provides an application programmer interface to system 1016 resident processes to users and/or developers at user systems 1012. The tenant data and the system data may be stored in various databases, such as Oracle™ databases.

Application platform 1018 includes an application setup mechanism 1138 that supports application developers' creation and of applications, which may be saved as metadata into tenant data storage 1022 by save routines 1136 for execution by subscribers as tenant process spaces 1104 managed by tenant management process 1110 for example. Invocations to such applications may be coded using PL/SOQL 34 that provides a programming language style interface extension to API 1132. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1116 for the subscriber making the invocation and executing the metadata as an application in a virtual machine.

Each application server 1100 may be communicably coupled to database systems, e.g., having access to system data 1025 and tenant data 1023, via a different network connection. For example, one application server 11001 might be coupled via the network 1014 (e.g., the Internet), another application server 1100N-1 might be coupled via a direct network link, and another application server 1100N might be coupled by yet a different network connection. Transfer Control Protocol and Internet Protocol (TCP/IP) are typical protocols for communicating between application servers 1100 and the database system. However, other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In one embodiment, therefore, an interface system implementing a load balancing function (e.g., an F5 Big-IP load balancer) is communicably coupled between the application servers 1100 and the user systems 1012 to distribute requests to the application servers 1100. In one embodiment, the load balancer uses a least connections algorithm to route user requests to the application servers 1100. Other examples of load balancing algorithms, such as round robin and observed response time, also can be used. For example, in certain embodiments, three consecutive requests from the same user could hit three different application servers 1100, and three requests from different users could hit the same application server 1100. In this manner, system 1016 is multi-tenant, wherein system 1016 handles storage of, and access to, different objects, data and applications across disparate users and organizations.

As an example of storage, one tenant might be a company that employs a sales force where each call center agent uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client machines/systems) communicate with application servers 1100 to request and update system-level and tenant-level data from system 1016 that may require sending one or more queries to tenant data storage 1022 and/or system data storage 1024. System 1016 (e.g., an application server 1100 in system 1016) automatically generates one or more SQL statements (e.g., SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

While embodiments of the present invention is described with reference to an on-demand service environment capable of supporting multiple tenants, embodiments of the present invention are not limited to multi-tenant databases nor deployment on application servers. Embodiments may be practiced using other database architectures, for instance, ORACLE®, DB2®, by IBM, and the like without departing from the scope of the embodiments claimed.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method of validating components of a dynamic user interface in an on-demand service environment including one or more servers, the method comprising:
    identifying one or more dynamic user interface pages, the identified one or more pages referencing one or more visual components;
    producing first and second compilation outputs based upon respective first and second invocations of a compiler configured to compile the identified one or more pages and associated page program code with reference to respective first and second builds of computer program code implementing at least a portion of the service environment;
    comparing the first and second compilation outputs to identify differences between the first and second compilation outputs;
    selecting one or more differences between the first and second compilation outputs as matching a pattern, the pattern configured to identify at least one regression error at an identifiable location, the location of the regression error capable of being processed to trace a cause of the regression error; and
    providing data indicating the selected one or more differences to a display device for display in a user interface.

2. The method of claim 1, wherein the selected one or more differences include text indicating a substantive difference or a nonsubstantive difference.

3. The method of claim 1, wherein the display device is a mobile computing device.

4. The method of claim 3, wherein the data indicating the selected one or more differences is configured to be displayed on the mobile computing device.

5. The method of claim 3, wherein the mobile computing device is one of: a mobile phone, a laptop computer, and a handheld computing device.

6. The method of claim 1, wherein the first and second compilation outputs include representations of respective first and second objects, and wherein comparing the first and second compilation outputs comprises:

creating first and second database objects via a parser, the parser configured to translate the representations of the first and second objects from a compiler-generated format to the respective first and second database objects; and comparing the first and second database objects, wherein the one or more differences between the first and second compilation outputs comprise one or more differences between the first and second database objects.

7. The method of claim 1, further comprising:

identifying one or more related objects that are related to the first and second compilation outputs, wherein the related objects comprise one or more standard page objects representing the one or more dynamic user interface pages for which the compiler produces the first and second compilation outputs; and presenting the related objects in the user interface in association with the first and second compilation outputs.

8. The method of claim 1, wherein the dynamic user interface pages comprise one or more tag specifications that reference the one or more visual components, and the one or more visual components are configured to send and receive data.

9. The method of claim 1, further comprising associating failure information with the one or more pages when the one or more pages fail to compile, wherein the failure information includes an error message generated by the compiler.

10. The method of claim 1, wherein the first and second builds comprise first and second sets of computer-executable instructions that implement at least portions of the dynamic user interface.

11. A computer-implemented method of validating components of a dynamic user interface in an on-demand service environment including one or more servers, the method comprising:

identifying one or more dynamic user interface pages, the identified one or more pages referencing one or more visual components;

producing first and second compilation outputs based upon respective first and second invocations of a compiler configured to compile the identified one or more pages and associated page program code with reference to respective first and second builds of computer program code implementing at least a portion of the service environment;

comparing the first and second compilation outputs to identify differences between the first and second compilation outputs;

selecting one or more differences between the first and second compilation outputs as matching a pattern, the pattern configured to identify at least one regression error at an identifiable location, the location of the regression error capable of being processed to trace a cause of the regression error; and providing data indicating the selected one or more differences to a first display device associated with a first user and to a second display device associated with a second user for display in a user interface.

12. The method of claim 11, wherein the second display device is a different type of device than the first display device, and one of the display devices is a mobile computing device.

13. The method of claim 12, wherein the data provided to the first display device is configured to be displayed on the first display device, and the data provided to the second display device is configured to be displayed on the second display device.

14. One or more non-transitory computer readable media having instructions stored thereon for validating components of a dynamic user interface in an on-demand service environment residing on a plurality of server machines, the instructions executable by a processor to cause one or more machines to:

identify one or more dynamic user interface pages, the identified one or more pages referencing one or more visual components;

produce first and second compilation outputs based upon respective first and second compiles of the identified one or more pages and associated page program code with reference to respective first and second builds of computer program code implementing at least a portion of the service environment;

compare the first and second compilation outputs to identify differences between the first and second compilation outputs;

select one or more differences between the first and second compilation outputs as matching a pattern, the pattern configured to identify at least one regression error at an identifiable location, the location of the regression error capable of being processed to trace a cause of the regression error; and provide data indicating the selected one or more differences to a display device for display in a user interface.

15. The non-transitory computer readable media of claim 14, wherein comparing the first and second compilation outputs includes:

performing a text comparison to identify one or more textual differences between the first and second compilation outputs.

16. Data processing apparatus for validating components of a dynamic user interface in an on-demand service environment, the apparatus comprising:

one or more processors; and one or more stored instructions which, when executed by the one or more processors, cause one or more servers to:

identify one or more dynamic user interface pages, the identified one or more pages referencing one or more visual components;

produce first and second compilation outputs based upon respective first and second compiles of the identified one or more pages and associated page program code with reference to respective first and second builds of computer program code implementing at least a portion of the service environment;

compare the first and second compilation outputs to identify differences between the first and second compilation outputs;

select one or more differences between the first and second compilation outputs as matching a pattern, the pattern configured to identify at least one regression error at an identifiable location, the location of the regression error capable of being processed to trace a cause of the regression error; and provide data indicating the selected one or more differences to a display device for display in a user interface.

17. The data processing apparatus of claim 16, wherein the display device is a mobile computing device.

18. The data processing apparatus of claim 17, wherein the data indicating the selected one or more differences is configured to be displayed on the mobile computing device.

19. The data processing apparatus of claim 17, wherein the mobile computing device is one of: a mobile phone, a laptop computer, and a handheld computing device.

20. The data processing apparatus of claim 16, wherein the one or more processors are situated at a server.

21. The data processing apparatus of claim 16, wherein a first processor is situated at a server, and a second processor is situated at a mobile computing device.

* * * * *